(12) United States Patent
Piepmeier et al.

(10) Patent No.: US 6,278,906 B1
(45) Date of Patent: Aug. 21, 2001

(54) UNCALIBRATED DYNAMIC MECHANICAL SYSTEM CONTROLLER

(75) Inventors: Jennelle Armstrong Piepmeier, Severna Park; Harvey Lipkin, Decatur; Gary Von McMurray, Atlanta, all of GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/492,613

(22) Filed: Jan. 27, 2000

Related U.S. Application Data

(60) Provisional application No. 60/117,829, filed on Jan. 29, 1999.

(51) Int. Cl.[7] ..................................................... G05B 13/04
(52) U.S. Cl. ............................. 700/250; 700/29; 700/31; 700/59; 700/63; 700/245; 700/258; 700/263
(58) Field of Search ..................................... 700/250, 251, 700/253, 258, 263, 56, 59, 63, 245, 29, 30, 31; 318/568.16, 568.13, 568.11

(56) References Cited

U.S. PATENT DOCUMENTS

| | | | |
|---|---|---|---|
| 4,338,672 | 7/1982 | Perzley . | |
| 4,753,569 | 6/1988 | Pryor | 700/250 |
| 4,942,538 | * 7/1990 | Yuan et al. | 700/259 |
| 4,954,762 | 9/1990 | Miyake et al. | 318/568.19 |
| 5,059,789 | * 10/1991 | Salcudean | 250/206.1 |
| 5,241,608 | 8/1993 | Fogel | 382/107 |
| 5,293,461 | * 3/1994 | Grudic et al. | 700/262 |
| 5,321,353 | 6/1994 | Furness | 318/568.11 |
| 5,390,288 | 2/1995 | Toda et al. | 700/258 |
| 5,430,643 | 7/1995 | Seraji | 700/249 |
| 5,684,713 | * 11/1997 | Asada et al. | 716/19 |
| 5,726,916 | * 3/1998 | Smyth | 702/151 |
| 5,752,513 | * 5/1998 | Acker et al. | 600/424 |
| 5,994,864 | * 11/1999 | Inoue et al. | 318/568.2 |
| 6,000,827 | * 12/1999 | Hosogi et al. | 700/48 |

OTHER PUBLICATIONS

"A Dynamic Quasi–Newton Method for Model Independent Visual Servoing" by Jenelle Armstrong Piepmeier, Georgia Institute of Technology, Jul. 29, 1999.

S. Hutchison, G.D. Hager, and P.I. Corke, "A Tutorial on Visual Servo Control," *IEEE Transactions on Robotics and Automation*, vol. 12, No. 5, pp. 651–670, Oct. 1996.

A.C. Sanderson and L.E. Weiss, "Adaptive Visual Servo Control Of Robots," in *Robot Vision*, A. Pugh, Ed., chapter Adaptive Visual Servo Control of Robots, pp. 107–116, Springer–Verlage, 1983.

A.J. Koivo and N. Houshangi, "Real–Time Vision Feedback For Servoing Robotic Manipulator With Self–Tuning Controller," *IEEE Transactions on Systems, Man, and Cybernetics*, vol. 21, No. 1, pp. 134–141, Jan./Feb. 1991.

(List continued on next page.)

Primary Examiner—William Grant
Assistant Examiner—Paul Rodriguez
(74) Attorney, Agent, or Firm—Thomas, Kayden, Horstemeyer & Risley, L.L.P.

(57) ABSTRACT

An apparatus and method for enabling an uncalibrated, model independent controller for a mechanical system using a dynamic quasi-Newton algorithm which incorporates velocity components of any moving system parameter(s) is provided. In the preferred embodiment, tracking of a moving target by a robot having multiple degrees of freedom is achieved using an uncalibrated model independent visual servo control. Model independent visual servo control is defined as using visual feedback to control a robot's servomotors without a precisely calibrated kinematic robot model or camera model. A processor updates a Jacobian and a controller provides control signals such that the robot's end effector is directed to a desired location relative to a target on a workpiece.

74 Claims, 8 Drawing Sheets

OTHER PUBLICATIONS

P.K. Allen, A. Timcenko, B. Yoshimi, and P. Michelman. "Automated Tracking and Grasping of a Moving Object with a Robotic Hand–Eye System," Tech. Rep. CUCS–034–91, Columbia University, 1991.

B. Espiau, F. Chaumette, and P. Rives, "A New Approach to Visual Servoing in Robotics," *IEEE Transactions on Robotics and Automation*, vol. 8, No. 3, pp. 313–326, Jun. 1992.

K. Hosoda and M. Asada, "Versatile Visual Servoing without Knowledge of True Jacobian," in IEEE/RSJ/GI International Conference on Intelligent Robots and Systems, Munich, Germany, Sep. 1994, pp. 186–193.

M. Jagersand, "Visual Servoing using Trust Region Methods and Estimation of the Full Coupled Visual–Motor Jacobian," in *IASTED Applications of Robotics and Control*, 1996.

N. Papanikolopoulos and P. Khosla, "Robotic Visual Servoing Around a Static Target: An Example of Controlled Active Vision," in Proceedings of the 1992 American Control Conference, Nic, France, May 1992, pp. 1489–1494.

R. Sharma, J–Y. Herve, and P. Cucka, "Dynamic Robot Manipulation Using Visual Tracking," in Proceedings of the 1992 IEEE International Conference on Robotics and Automation, Nice, France, May 1992, pp. 1844–1849.

D. Bennett, D. Geiger, and J.M. Hollerbach, "Autonomous Robot Calibration for Hand–Eye Coordination," *The International Journal of Robotics Research*, vol. 10, No. 5, pp. 550–559, Oct. 1991.

N. Hollinghurst and R. Cipolla, "Uncalibrated Stereo Hand–Eye Coordination," *Image and Vision Computing*, vol. 12, No. 3, pp. 187–192, 1994.

L.E. Weiss, A.C. Sanderson, and C.P. Neuman, "Dynamic Sensor–Based Control of Robots with Visual Feedback," *IEEE Journal of Robotics and Automation*, vol. 3, No. 5, pp. 404–417, Oct. 1987.

J.T. Feddema, C.S.G. Lee, and O.R. Mitchell, "Automatic Selection of Image Features For Visual Servoing of a Robot Manipulator," in Proceedings of the 1989 IEEE International Conference on Robotics and Automation, May 1989, pp. 832–837.

J. T. Feddema and O.R. Mitchell, "Vision–Guided Servoing with Feature–Based Trajectory Generation," *IEEE Transactions on Robotics and Automation*, vol. 5, No. 5, pp. 691–7000, Oct. 1989.

J.T. Feddema and C.S. Lee, "Adaptive Image Feature Prediction and Control for Visual Tracking with a Hand–Eye Coordinated Camera," *IEEE Transactions on Systems, Man, and Cybernetics*, vol. 20, No. 5, pp. 1172–1183, Sep./Oct. 1991.

N. Papanikolopoulos, P.K. Khosla, and T. Kanade, "Vision and Control Techniques for Robotic Visual Tracking," Apr. 1991, pp. 857–864.

G. D. Hager, W. Chang, and A. S. Morse, "Robot Hand–Eye Coordination Based on Stereo Vision," *IEEE Control Systems*, vol. 15, No. 1, pp. 30–39, Feb. 1995.

A. Castano and S. Hutchison, "Visual Compliance: Task Directed Visual Servo Control," *IEEE Transactions on Robotics and Automation*, vol. 10, No. 3, pp. 334–341, Jun. 1994.

B.H. Yoshimi and P.K. Allen, "Active Uncalibrated Visual Servoing," in Proceedings of the IEEE International Conference on Robotics and Automation, San Diego, 1994, pp. 156–161.

D. Kim, A.A. Rizzi, G.D. Hager, and D.E. Koditschek, "A 'Robust' Convergent Visual Servoing System," in Proceedings 1995 IEEE/RSJ International Conference on Intelligent Robots and Systems, Aug. 1995, pp. 348–353.

E. Marchand, F. Chaumette, and A. Rizzo, "Using the task function approach to avoid robot joint limits and kinematic singularities in visual servoing," in IEEE International Conference on Intelligent Robots and Systems, Osaka, Japan, Nov. 1996, pp. 1083–1090.

R. Joshi and A. C. Sanderson, "Application of Feature–Based Multi–View Servoing for Lamp Filament Alignment," *IEEE Robotics and Automation Magazine*, vol. 5, No. 4, pp. 25–32, Dec. 1998.

K. Hosoda, I. Igarashi, and M. Asada, "Adaptive Hybrid Control for Visual and Force Servoing in an Unknown Environment," *IEEE Robotics and Automation Magazine*, vol. 5, No. 4, pp. 39–43, Dec. 1998.

K. Hashimoto, T. Ebine, and H. Kimura, "Visual Servoing with Hand–Eye Manipulator–Optimal Control Approach," *IEEE Transactions on Robotics and Automation*, vol. 12, No. 5, pp. 766–774, Oct. 1996.

H. Hashimoto, T. Kubota, M. Kudou, and F. Harashima, "Self–Organizing Visual Servo System Based on Neural Networks" in Proceedings of the American Control Conference, Boston, MA, Jun. 1991, pp. 2262–2267.

J. Carusone and G.M.T. D'Eleurterio, "The Feature CMAC: A Neural–Network–Based Vision System for Robotic Control," in Proceedings of the 1998 IEEE International Conference on Robotics and Automation, Leuven, Belgium, May 1998, pp. 2959–2964.

J.E. Dennis and R. B. Schnabel, *Numerical Methods for Unconstrained Optimization and Nonlinear Equations*, Prentice–Hall, Englewood Cliffs, New Jersey, 1983.

L. E. Scales, *Introduction to Non–Linear Optimization*, Springer–Verlag, New York 1985.

M. Jagersand, O. Fuentes, and R. Nelson, "Experimental Evaluation of Uncalibrated Visual Servoing for Precision Manipulation," in Proceedings of International Conference on Robotics and Automation, Albuquerque, NM, Apr. 1997, pp. 2874–2880.

W.L. Brogan, *Modern Control Theory*, Prentice Hall, Englewood Cliffs, N.J., 1985.

S. Haykin, *Adaptive Filter Theory*, Prentice Hall, Englewood Cliffs, N J, 1985.

A. H. Sayed and T. Kailath, "A State–Space Approach to Adaptive RLS Filtering," *IEEE Signal Processing Magazine*, vol. 11, No. 3, pp. 18–60, Jul. 1994.

L. Ljung L. Guo and P. Priouret, "Performance Analysis of the Forgetting Factor RLS Algorithm," *International Journal of Adaptive Control and Signal Processing*, vol. 7, pp. 525–537, 1993.

E. Eleftheriou and D.D. Falconer, "Tracking Properties and Steady–State Performance of RLS Adaptive Filter Algorithms," *IEEE Transactions on Acoustic, Speech, and Signal Processing*, vol. 34, No. 5, pp. 1097–1109, Oct. 1986.

J. Lin, J.G. Proakis, F. Ling, and H. Lev–Ari, "Optimal Tracking of Time–Varying Channels: A Frequency Domain Approach for Known and New Algorithms," *IEEE Transactions on Selected Areas in Communications*, vol. 13, No. 1, pp. 141–152, Jan. 1995.

* cited by examiner

UNCALIBRATED DYNAMIC MECHANICAL SYSTEM CONTROLLER

CLAIM OF PRIORITY

This application claims priority to, and the benefit of the filing date of, copending U.S. provisional application entitled, "Dynamic Quasi-Newton Method for Uncalibrated Visual Servoing," having Ser. No. 60/117,829, filed Jan. 29, 1999, which is entirely incorporated herein by reference.

TECHNICAL FIELD

The present invention is generally related to an uncalibrated, model independent controller for a mechanical system and, more particularly, is related to a system and method employed by a robot in visual tracking of a moving target.

BACKGROUND OF THE INVENTION

Control of mechanical systems by a computer, in the prior art, is typically based on a model of the mechanical system which relates controller inputs (sensor data) to the controller outputs (variables controlled by the computer). One example of a mechanical system controller is the cruise control apparatus of a car. Here, the controller input variable for the cruise control apparatus is the speed of the car as sensed by a tachometer, a speedometer, or the like. The detected speed of the car, or a representative parameter such as an error signal, is input into the controller computer. Based on whether the car must accelerate or decelerate, the controller computer initiates a control action (controller output variable), such as depressing the gas pedal more to initiate an acceleration of the car.

For prior art, the key to controlling any mechanical system is the accurate modeling of the mechanical system that relates the controller inputs (sensor data) to the appropriate setting of the controller outputs. Models of a mechanical system have been traditionally developed in one of two ways. The first prior art method is to construct the mechanical system model using analytical techniques. This method involves mathematical modeling of all the system parameters and physical parameters. While this method is clearly the dominant prior art modeling method, several significant problems arise. First, the model of the mechanical system is only as good as the data used to construct the model. Thus, if the measurements of the physical dimensions of the mechanical system are not extremely accurate, the model will not be valid. In the world of mass production, this means that parts must be constructed very accurately in order to duplicate the mechanical system upon which the controller model is based upon. A slight difference between one part of the product and the mechanical system model could render the entire controller model invalid for the product in which that part is used. Additionally, if any parameter in the system changes over time, then the model may no longer be valid. Any time a model no longer accurately represents the mechanical system, the controller computer will be incapable of performing as desired.

Another more recent prior art modeling technique for deriving a model of a mechanical system involves the use of neural networks and/or fuzzy logic to construct the relationship between controller inputs and outputs. The appeal of this second approach is that some of the measurement errors that frequently plague the first modeling method can be avoided. The actual construction of the input/output relationship varies slightly between the neural network and the fuzzy logic modeling methods. For neural networks, a training period is required to construct the proper relationship between the input and output variables. This training period can involve a rather lengthy period of time because of the inputting of various levels of system inputs and the recording of the sensor data. After the neural network system performs sufficient tests over the entire range of input and output variables, the computer controller can construct the appropriate mechanical system model.

Developing a controller model of a mechanical system using fuzzy logic requires a person knowledgeable in the mechanical system. The person must construct the fuzzy sets and derive the correct relationships in order for the controller to function properly. The time and cost necessary for such a highly skilled person to develop the necessary fuzzy logic algorithms and computer control code is often prohibitive.

As with the first modeling technique, models based upon either neural networking or fuzzy logic become invalid if any mechanical system parameter should change with time. In such a case, the neural networking and fuzzy logic controllers must be retrained in order to work properly.

As a further illustrative example of a mechanical system, a simple robot is considered in detail. Robotic technology is a fast paced changing art allowing each new generation of robots to perform tasks of ever-increasing difficulty. Some advanced robots employ a dynamic look-and-move method which allows a robot to position its end-effector relative to a target on a workpiece such that the robot can complete a predetermined operation. The robot's end-effector may be a tool, such as a cutter or a gripper, a sensor, or some other device. An end-effector is typically located on the distal end of a robot arm. The workpiece is the object of the robot's predetermined task. A target is a predetermined reference point on or near the workpiece. For example, a robot may have an arm holding a paint sprayer (end-effector) for spray painting (predetermined task) an automobile (workpiece).

If the workpiece is moving, such as when the above-described automobile is travelling down a continuously moving assembly line, the robot's predetermined task becomes considerably more complicated. Tracking of moving targets with cameras is known in the art. However, these prior art control methods are model based and require a precise kinematic model of the robot and the camera system geometry. That is, control algorithms directing movement of the robot members through controlled couplers, such as a joint, screw or the like, must have a detailed model of the relationships of each member of the robot, each coupler of the robot, and the robot's end-effector. Also, the control algorithm requires a precise model of the relationship between the robot, the camera and the workpiece. An algorithm based upon a camera and servo control of the controlled couplers is known as a visual servoing algorithm.

Before the robot can begin its predetermined task, all necessary reference locations must be calibrated. That is, the initial position of the robot's end effector, members and controlled couplers must be determined. Also, the position of the workpiece and the associated target must be determined. All reference locations must be calibrated to the camera position. If any of the above described elements are not in the proper initial position, algorithms must be recalculated or the out-of-position element must be moved into its predetermined location. For example, the workpiece may have to be placed into a jig and the jig positioned at an initial starting position. Also, any movement or relocation of the camera will cause errors because reference locations will not be properly mapped into the visual servoing algorithm.

Development of a model independent approach for robotics control has been considered. The model independent approach describes visual servoing algorithms that are independent of hardware (robot and camera systems) types and configuration of the working system (robot and workpiece). The most thorough treatment of such a method has been performed by Jagersand and described in M. Jagersand, Visual Servoing Using Trust Region Methods and Estimation of the Full Coupled Visual-Motor Jacobian, *IASTED Applications of Robotics and Control*, 1996, and in M. Jagersand, O. Fuentes, and R. Nelson, Experimental Evaluation of Uncalibrated Visual Servoing for Precision Manipulation, *Proceedings of International Conference on Robotics and Automation*, 1997. Jagersand formulates the visual servoing problem as a nonlinear least squares problem solved by a quasi-Newton method using Broyden Jacobian estimation. That is, tracking a moving target is a predictive method employing a static based algorithm solving a series of static problems and equations. Jagersand demonstrates the robust properties of this type of control, demonstrating significantly improved repeatability over standard joint control even on an older robot with backlash. However, Jagersand's work focuses on servoing a robot end-effector to a static target. That is, the workpiece is not moving.

Thus, a heretofore unaddressed need exists in the industry to address the aforementioned deficiencies and inadequacies.

SUMMARY OF THE INVENTION

The present invention provides an apparatus and method for enabling an uncalibrated, model independent controller for a mechanical system using a dynamic quasi-Newton algorithm which incorporates velocity components of any moving system parameter(s).

Briefly described, in architecture, a preferred embodiment enabling tracking of a moving target by a robotic system having multiple degrees of freedom using an uncalibrated model independent visual servo controller is achieved by the method and apparatus of the present invention, and can be implemented as follows. Model independent visual servo control is defined as using visual feedback to control robot servomotors without precisely calibrated kinematic robot models and camera models. A sensing system, such as a camera, detects the position of at least a target on a workpiece and a point on the robot, such as on the robot's end-effector. The detected positions of the target and the point are converted by a processor into information used by the dynamic quasi-Newton algorithm of the present invention to calculate a translation model, hereinafter known as the Jacobian. A Jacobian specifies differential changes in the robot position per differential changes in the joint position of each joint (rotary or prismatic) of the robot. A controller sends control signals, as specified by the Jacobian calculated by the processor, to servomotors controlling the robot's rotating joints. With each subsequent update of the Jacobian, the position of the robot's members are adjusted such that the end-effector is directed to a desired location relative to the target.

The above-described controller is equally applicable to controlling other types of mechanical systems. Because the controller does not require a kinematic model, the controller is particularly suited to mechanical systems having at least one moving parameter, or to mechanical systems for which a precise kinematic model is impractical or impossible to develop, such as when a parameter of the kinematic model is changing. Nor does the controller require a detailed model of the sensing system. For example, the camera of a visual tracking system can be repositioned or bumped without interrupting the tracking process or diminishing tracking accuracy. Similarly, the sensor system may utilize different types of sensors, such as mechanical sensors, magnetic sensors, visual sensors, optical sensors, sonic sensors, temperature sensors, infrared sensors, force sensors, proximity sensors or the like.

One object of the present invention is to enable a model independent controller for controlling a mechanical system.

Another object of the present invention is to enable a controller to control a mechanical system after a change in a system parameter.

Another object of the present invention is to enable a controller to control a mechanical system after a change in a system parameter after a shortened retraining period.

Another object of the present invention is to enable a model independent controller for tracking a moving target for use in a tracking system.

Another object of the present invention is to enable a model independent visual servoing controller for tracking a moving target for use by a robot.

Another object of the present invention is to enable an uncalibrated, model independent visual servoing controller for tracking a moving target for use by a robot. That is, the initial positioning of the robot end-effector, members and controlled couplers, or the initial positioning of the workpiece and the associated target, is not required. Also, exact positioning of the camera in a predetermined location is not required. The robot will effectively and accurately perform its predetermined task even if the camera is displaced or if the workpiece is not properly positioned on the moving conveyor belt.

Another object of the present invention is to enable a model independent controller for tracking a moving target for use in a controller system which utilizes a sensor, or combination of sensors, such as but not limited to a mechanical sensor, a magnetic sensor, an optical sensor, a visual sensor, a sonic sensor, a temperature sensor, an infra-red sensor, a force sensor, a proximity sensor or other sensors as commonly known in the art.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

I. Description of a Preferred Embodiment

Figure 1:
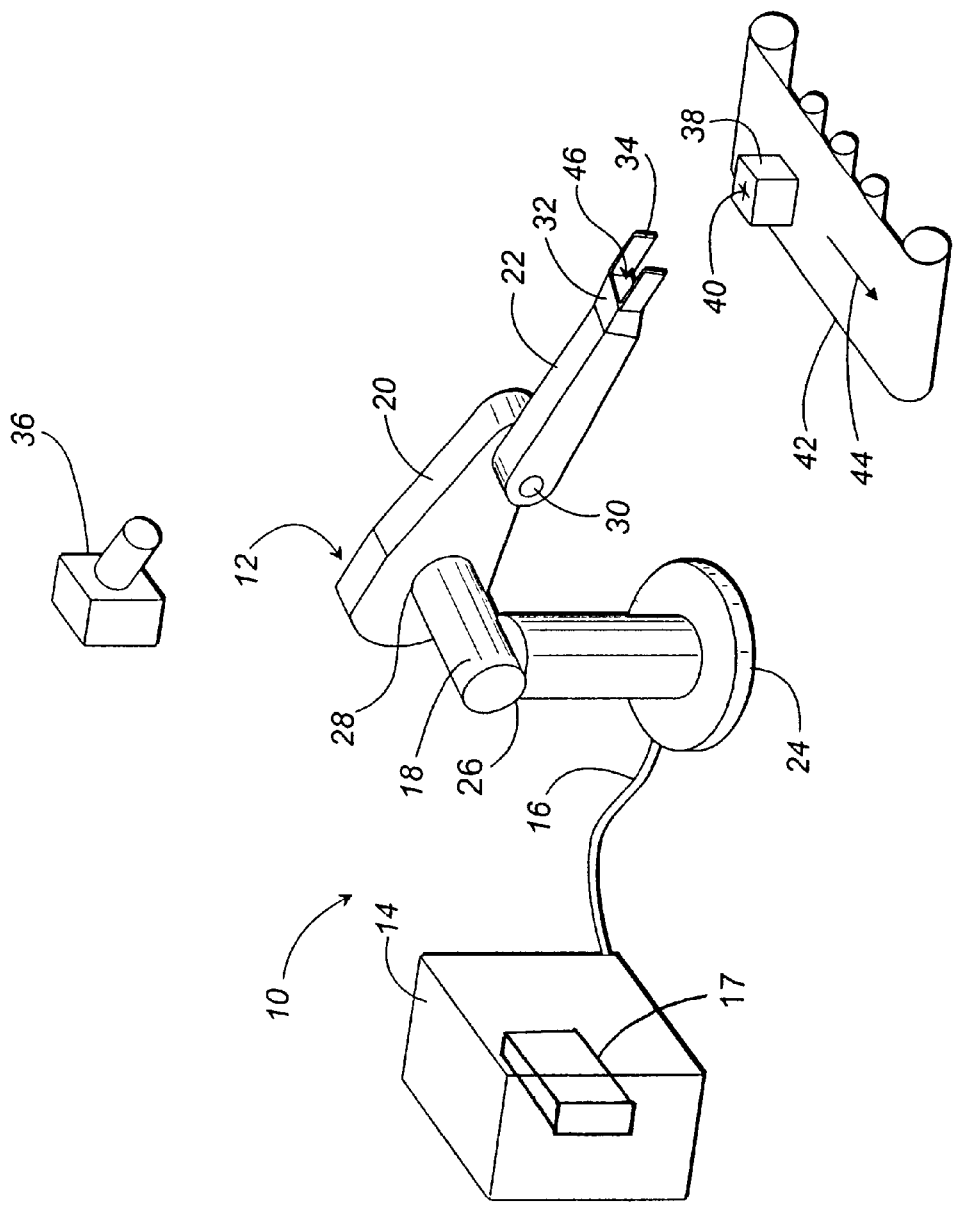
FIG. 1 is a diagram of a robot and workpiece system where the workpiece is moving along a conveyor.

FIG. 1 shows a mechanical system which includes a controller computer 14, a robot 10 and a workpiece 38. The robot 10 has a multi-member robot arm 12 connected to a controller computer 14 via a control cord 16. In the preferred embodiment, processor 17 resides within the controller 14, however, processor 17 may reside in any convenient location outside of the controller 14. The robot 10, used to illustrate the method and apparatus of the present invention in a preferred embodiment, includes a pedestal 24, upon which the robot arm 12 is mounted. The robot arm 12 has three members 18, 20, and 22. Member 18 is connected to pedestal 24 with a rotating joint 26. Residing within rotating joint 26 is a sensor, known as a joint resolver (not shown), which detects the angular position of the rotating joint 26. The angular position of rotating joint 26 is controlled by a servoing motor (not shown). The position of member 18 is known when the angular position of rotating joint 26 is determined. Controller 14 sends control signals to the servoing motor to adjust the angular position of rotating joint 26, thereby controlling the position of member 18. Member 20 is connected to member 18 by rotating joint 28. Member 22 is connected to member 20 by rotating joint 30. Rotating joint 30 and rotating joint 28 are controlled in a similar manner as rotating joint 26. End-effector 34 is connected to arm member 22 by wrist joint 32. Wrist joint 32 may have up to three degrees of freedom of movement. The position of member 20, member 22 and end-effector 34 is controlled by adjusting the angular position of their respective joints.

A camera 36 views workpiece 38 positioned on conveyor 42. In this example system, workpiece 38 is moving on conveyor 42 in the direction shown by the arrow 44. The camera 36 is viewing the target 40 located on the workpiece 38 and a predefined point 46 on end-effector 34. The image recorded by camera 36, which contains images of the target 40 and point 46, is transmitted to a processor 17 residing in controller 14 via means commonly employed in the art, such as by cable (not shown), radio signals, infrared signals or the like. The image is converted by the processor 17 into pixels employing methods commonly used in the art. Pixels associated with target 40 and point 46 are then marked and used as the points for reference necessary for the processing algorithm. The processing algorithm is then executed by the processor 17 to generate a translation model, or Jacobian. The Jacobian specifies differential changes in the robot position per differential changes in the angular position of rotating joints 26, 28, 30 and 32. Processor 17 provides the controller 14 control signals which are sent to the robot 10 such that the end-effector 34 is directed to the desired location relative to the target 40. When the robot 10 end-effector 34 is properly positioned, the robot 10 can begin its predefined task. One having ordinary skill in the art will realize that processor 17 can reside at any convenient location and provide control signals to controller 14 using methods known in the art without departing substantially from the principles of the present invention.

In a preferred embodiment an image-based visual servoing method, which can be classified as dynamic look-and-move method, is illustrated. In addition, the processing method is endpoint closed-loop (ECL), which is a method employing a vision system that views both the target 40 and the point 46 located on the end effector 34. One skilled in the art will appreciate that alternative embodiments may detect the position of two points using any detection means or combination of detection means, such as but not limited to, mechanical sensors, magnetic sensors, visual sensors, optical sensors, sonic sensors, temperature sensors, infrared sensors, force sensors, proximity sensors or the like. Additionally, one skilled in the art will realize that alternative embodiments of the invention will perform equally well with an eye-in-hand method, or an endpoint open loop system, where the camera is mounted on the robot's end effector.

II. Controller Block Diagram

Figure 2:
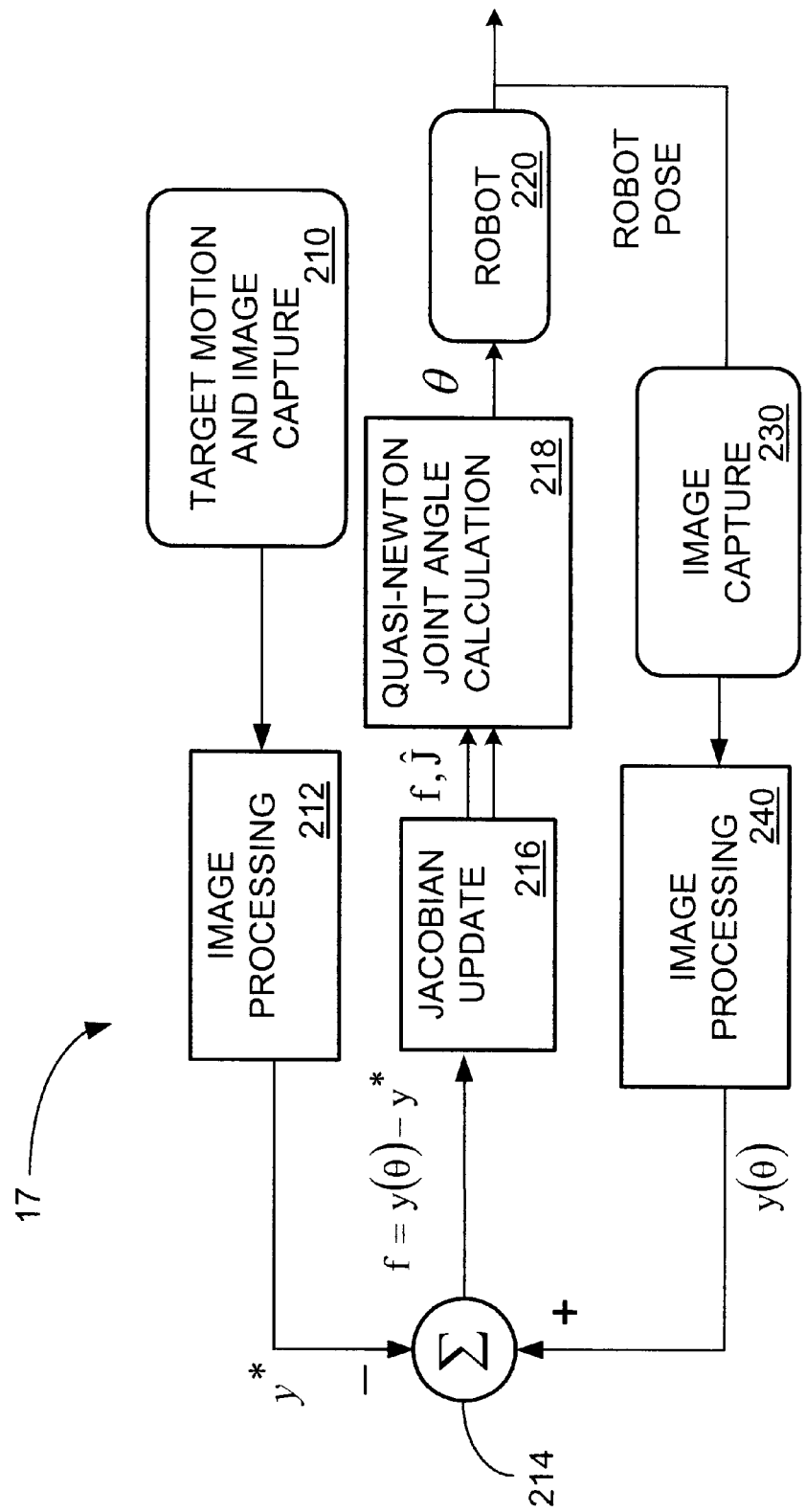
FIG. 2 is a controller block diagram of the preferred embodiment of the invention employing a dynamic quasi-Newton algorithm.

FIG. 2 shows the controller block diagram as applied to the robot 10 of FIG. 1. Positions of rotating joints 26, 28 and 30, position of wrist joint 32, positioning of the pedestal (if movable) and any other moveable connectors of the robot 10 (see FIG. 1) are calculated using a nonlinear least squares optimization method which minimizes the error in the image plane. The processing algorithm estimates the Jacobian on-line and does not require calibrated models of either the camera configuration or the robot kinematics. A Jacobian, for the robot embodiment, is the group of servo motor angle positions controlled by the controller 14 (controller outputs). Often, servo motor angle position information is grouped in a matrix format, or the like, to facilitate the mathematical representation and calculation of the controller outputs by the processor 17. This means, for example, that the processing algorithm, hereinafter the dynamic quasi-Newton algorithm, provides a Jacobian (joint positions as servo motor angles) as reference inputs for the joint-level controllers. As system parameters change with time (work piece moving down the conveyor belt), the processing algorithms (dynamic quasi-Newton algorithm) incorporate the velocity of the changing parameters to calculate a Jacobian update (new joint positions) for the controller such that the robot can perform its predetermined task (moving the end-effector to the target).

Describing FIG. 2 in detail, the camera 36 captures an image which includes images of at least the target 40 and the point 46 on the end-effector 34 (FIG. 1), as shown in block 210. The image is then processed by the processor 17 residing in controller 14, shown by block 212, to generate a datum point, y*, of the moving target 40. An error signal $f$ is generated at block 214 by subtracting datum point y* from the datum point y($\theta$). The error signal contains rate of change information, such as velocity of the moving target 40 of FIG. 1. The Jacobian is updated by the processor at block 216 and joint angle positions are calculated at block 218. Control signals are sent to the robot 10 (FIG. 1) causing the robot 10 to adjust its position at block 220. The camera 36 captures the image of the new positions of point 46 and the target 40 at block 230. The processor 17 processes the image at block 240 to generate a datum point y(θ). y(θ) is passed to block 214 for processing as described above.

III. Dynamic Quasi-Newton Algorithm Defined

The dynamic quasi-Newton algorithm, as described above, is now described in greater detail. For a moving target 40 (FIG. 1) at position y*(t), and point 46 of the end-effector 34 at position y(θ), as seen in an image plane, the residual error between the target 40 and point 46 can be expressed as f (θ,t)=yθ−y*(t). The objective function to be minimized, F, is a function of squared error.

$$F(\theta, t) = \frac{1}{2} f^T(\theta, t) f(\theta, t)$$

The Taylor series expansion about θ,t is $$F(\theta+h_\theta, t+h_t)=F(\theta,t)+F_{74} h_{74} +F_t h_t+ \ldots$$

where $F_\theta$, $F_t$ are partial derivatives and $_\theta$, $h_t$ are increments of θ, t. For a fixed sampling period $h_t$, F is minimized by solving $$0 = \frac{\partial F(\theta + h_\theta, t + h_t)}{\partial \theta}$$

$$0=F_\theta+F_{\theta\theta}h_\theta+F_{t\theta}h_t +O(h_\theta^2)$$

The term $O(h_\theta^2)$ indicates second order terms where $h_t$ is absorbed into $h_\theta$ since it is assumed they are on the same order of magnitude. Dropping the higher order terms yields $$0=F_\theta+F_{\theta\theta}h_\theta+F_{t\theta}h_t,$$

$$h_\theta=-(F_{\theta\theta})^{-1}(F_{74}+F_{t\theta}h_t)$$

$$\theta_{k+1}=\theta_k-(F_{\theta\theta})^{-1}(F_\theta+F_{t\theta}h_t), \quad (1)$$

where the discretization $h_\theta=\theta_{k+1}-\theta_k$ is introduced. Equation (1) is referred to as the "dynamic" Newton's method. If the target is static, F is a function of θ and $F_{t\theta}=0$. This results in the "static" Newton's method, $\theta_{k+1}=\theta_k-(F_{\theta\theta})^{-1}(F_{74})$.

Expanding the terms $F_\theta$, $F_{\theta\theta}$, and $F_{t\theta}$ $$F_\theta=J_k^T f_k$$

$$F_{\theta\theta}=J_k^T J_k+S_k$$

$$F_{t\theta} = J_k^T \frac{\partial f_k}{\partial t}$$

and substituting results in $$\theta_{k+1} = \theta_k - (J_k^T J_k + S_k)^{-1}\left(J_k^T f_k + J_k^T \frac{\partial f_k}{\partial t} h_t\right)$$

where $$S = \frac{\partial J^T}{\partial \theta} f$$

and $$J = \frac{\partial f}{\partial \theta} = \frac{\partial y}{\partial \theta}$$

the Jacobian. To compute the terms S and J analytically would require a calibrated system model. The term S is difficult to estimate, but as $\theta_k$ approaches the solution, it approaches zero. Hence, it is often dropped (also known as the Gauss-Newton method). The convergence properties of a dynamic Gauss-Newton method are similar to the dynamic Newton method provided S is not too large.

The Jacobian J can be replaced in the Gauss-Newton method by an estimated Jacobian, Ĵ, using Broyden estimation. The iteration then becomes a quasi-Newton method where the term S is set to zero.

$$\theta_{k+1} = \theta_k - (\hat{J}_k^T \hat{J}_k)^{-1} \hat{J}_k^T \left(f_k + \frac{\partial f_k(t)}{\partial t} h_t\right)$$

The convergence properties of a dynamic Gauss-Newton method are similar to the dynamic Newton method provided S is not too large.

The term $$\frac{\partial f(t)}{\partial t}$$

is a rate of change term, where $$-\frac{\partial y^*(t)}{\partial t} = \frac{\partial f(t)}{\partial t},$$

such as the velocity of the target 40 (FIG. 1) in the image space viewed by the camera. Since only first order information on the target 40 is available from the vision information, velocity estimates are used. Broyden's method is a quasi-Newton method; the algorithm substitutes an estimated Jacobian for the analytic Jacobian based on changes in the error function corresponding to changes in state variables. The estimated Jacobian is a secant approximation to the Jacobian. As with Newton's method, the moving target scenario requires that the appropriate time function derivatives are included. A dynamic Broyden's method for a moving target scenario can be derived in a similar manner to the dynamic quasi-Newton's method. However, for brevity the derivation is omitted here.

Let $\hat{J}_k$ represent the approximation to $J_k$. For this problem formulation, the Jacobian represents a composite Jacobian including both robot and image Jacobians. The Broyden update, $\Delta \hat{J}$, for a static target scenario is given as follows.

$$\Delta \hat{J}_{static} = \frac{(\Delta f - \hat{J}_k h_\theta)h_\theta^T}{h_\theta^T h_\theta}$$

$$\Delta f=f_k-f_{k-1}$$

$$f_k=f(\theta_k,t_k)$$

$$h_\theta=\theta_k-\theta_{k-1}$$

The proposed dynamic Broyden update contains an additional term, $$\frac{\partial f_k(t)}{\partial t} h_t,$$

having a rate of change component.

$$\Delta \hat{J} = \frac{\left(\Delta f - \hat{J}_k h_\theta + \frac{\partial f_k(t)}{\partial t} h_t\right) h_\theta^T}{h_\theta^T h_\theta} \quad (6)$$

Notice that if the target stops moving, the term $$\frac{\partial f_k(t)}{\partial t} = 0,$$

and the dynamic Broyden update term is identical to that for a static target.

Incorporating the dynamic Broyden update above results in the following quasi-Newton approach, known as a dynamic Broyden's Method, given by the following:

Dynamic Broyden's Method

Given f: $R^n \to R^m$; $\theta_0$, $\theta_1 \in R^n$; $\hat{J}_0 \in R^{m \times n}$ Do for k=1,2 . . .

$\Delta f = f_k - f_{k-1}$ $h_\theta = \theta_k - \theta_{k-1}$ $$\hat{J}_k = \hat{J}_{k-1} + \frac{\left(\Delta f - \hat{J}_{k-1} h_\theta - \frac{\partial f_t(t)}{\partial t} h_t\right) h_\theta^T}{h_\theta^T h_\theta}$$

$$\theta_{k+1} = \theta_k - \left(\hat{J}_k^T \hat{J}_k\right)^{-1} \hat{J}_k^T \left(f_k + \frac{\partial f_k(t)}{\partial t} h_t\right)$$

One skilled in the art will appreciate that the $$\frac{\partial f_k(t)}{\partial t}$$

term, which represents a rate of change in the detected target location (velocity), may be multiplied by a scalar, may have an added constant, and/or may be further integrated, without departing substantially from the principles of the method and apparatus of the present invention.

The term $$\frac{\partial f_k(t)}{\partial t}$$

includes the velocity (rate of change) of the target, the velocity (rate of change or movement) of the end-effector and any movement or repositioning of the camera. For example, if the camera is accidentally bumped or intentionally repositioned during the target tracking process, the tracking process will not be interrupted and the tracking process will be successfully and accurately effected.

IV. Recursive Least Squares Estimation

Since the Jacobian update contains only information from the previous update, the algorithm may display instabilities in the presence of noise above some level. Greater stability can be achieved if the Jacobian estimation considers data over a period of time instead of just the previous iteration. The increased stability can be achieved using an exponentially weighted recursive least squares (RLS) algorithm. Equations for $\hat{J}_k$ and $P_k$ define a recursive update for estimating $J_k$. A dynamic quasi-Newton method using the RLS Jacobian estimation scheme follows.

$$\hat{J}_k = \hat{J}_{k-1} + \frac{\left((f_k - f_{k-1}) - \hat{J}_{k-1} h_\theta - \frac{\partial f_k}{\partial t} h_t\right) h_\theta^T P_{k-1}}{\lambda + h_\theta^T P_{k-1} h_\theta}$$

$$P_k = \frac{1}{\lambda}\left(P_{k-1} - \frac{P_{k-1} h_\theta^T h_\theta P_{k-1}}{\lambda + h_\theta^T P_{k-1} h_\theta}\right)$$

A dynamic quasi-Newton method with a RLS estimation is shown below.

Given f: $\Re^n \to \Re^m$; $\theta_0, \theta_1 \in \Re^n$; $\hat{J}_0 \in \Re^{m \times n}$, $P_0 \in \Re^{n \times n} \lambda \in (0,1)$ Do for k=1,2, . . .

$\Delta f = f_k - f_{k-1}$ $h_\theta = \theta_k - \theta_{k-1}$ $$\hat{J}_k = \hat{J}_{k-1} + (\lambda + h_\theta^T P_{k-1} h_\theta)^{-1} \left(\Delta f - \hat{J}_{k-1} h_\theta - \frac{\partial f_k(t)}{\partial t} h_t\right) h_\theta^T P_{k-1}$$

$$P_k = \frac{1}{\lambda}\left(P_{k-1} - (\lambda + h_\theta^T P_{k-1} h_\theta)^{-1} (P_{k-1} h_\theta^t h_\theta P_{k-1})\right)$$

$$\theta_{k-1} = \theta_k - \left(\hat{J}_k^T \hat{J}_k\right)^{-1} \hat{J}_k^T \left(f_k + \frac{\partial f_k(t)}{\partial t} h_t\right)$$

End for

The RLS algorithm minimizes a weighted sum of the squares of the differences in each iteration for $(\theta, t)=(\theta_{i-1}, t_{i-1})$. The format is similar to the dynamic Broyden's method with the exception of $\lambda$ and $P_k$. The parameter $\lambda$ can be tuned to average in more or less of the previous information. A $\lambda$ close to ~1 results in a filter with a longer memory. The RLS algorithm may be used for system identification, particularly for visually guided control. One skilled in the art will realize that the above-described quasi-Newton method with RLS estimation will be equally applicable to other systems. The expected output from the previous iteration, $\hat{J}_k h_{74}$ is compared with the desired signal $$\Delta f - \frac{\partial f_k(t)}{\partial t} h_t.$$

This is multiplied by the gain $K_{k-1}$ and the product is used to update the Jacobian estimate.

Figure 3:
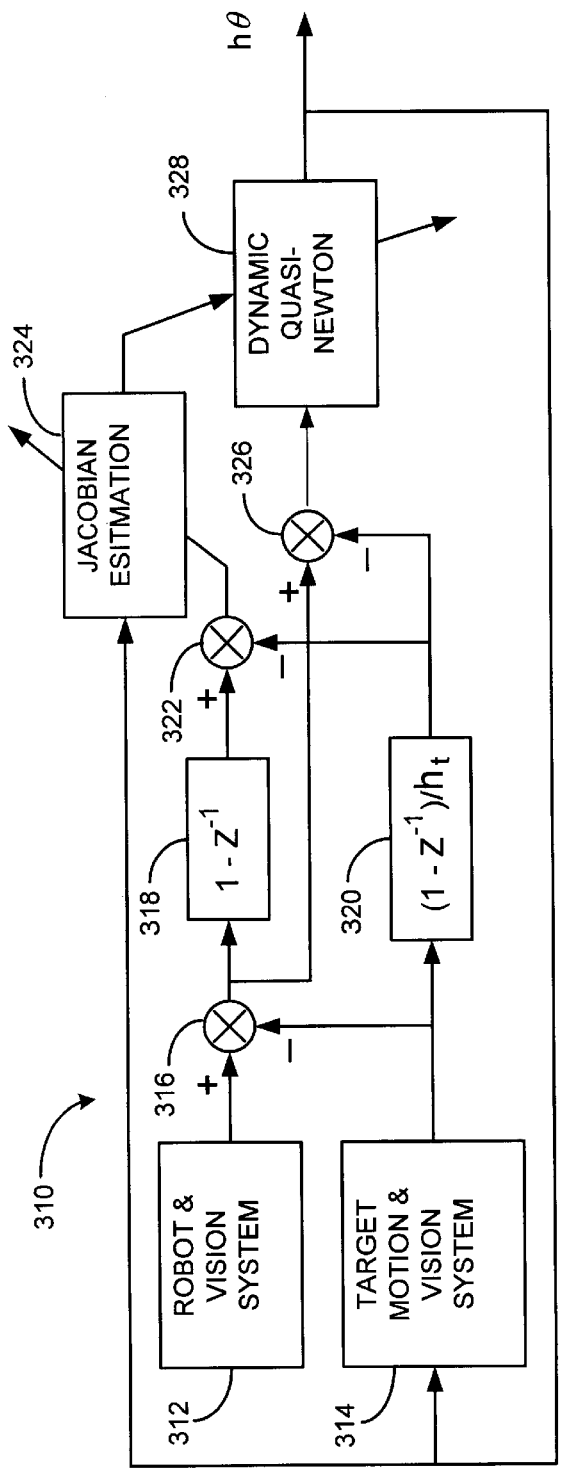
FIG. 3 is a block diagram of an embodiment of the invention employing a dynamic quasi-Newton with a recursive least squares (RLS) algorithm.

FIG. 3 is a block diagram 310 representing the dynamic quasi-Newton method with RLS estimation. Block 312 corresponds to the robot end-effector position. Block 314 corresponds to the target position. The target position is subtracted from the robot end-effector position at node 316 to determine an error value. Block 318 provides a gain to the error signal and block 320 provides a gain to the target position. The output of blocks 318 and 320 are summed as shown at node 322 and sent to the Jacobian Estimation block 324. Additionally, the error value from block 316 is summed with the output of block 320 as shown at node 326 and sent to the dynamic quasi-Newton block 328. The output of the dynamic quasi-Newton block 328 is returned to the target position, block 314, for calculations for the next time period.

Figure 4:
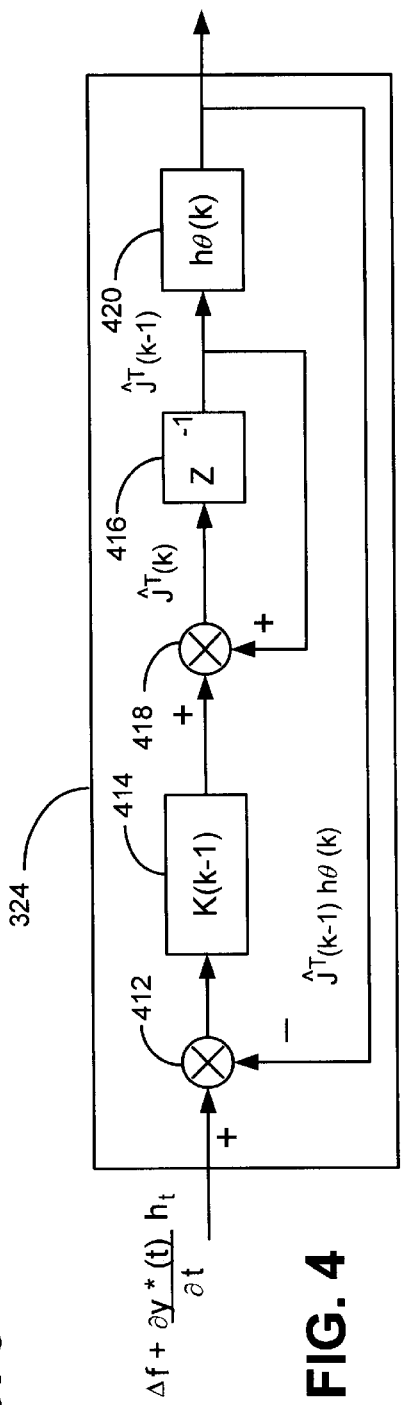
FIG. 4 is a block diagram showing the Jacobian estimation scheme of FIG. 3.

FIG. 4 is a block diagram showing the Jacobian estimation 324 scheme of FIG. 3. The gain K is given below:

$$K_{k-1} = \frac{h_\theta^T P_{k-1}}{\lambda + h_\theta^T P_{k-1} h_\theta}$$

Summing node 412 sums the two values as shown in FIG. 4. Block 414 provides a gain to the output of node 412. Node 416 and block 418 provide a feedback loop as shown. Block 420 provides a final gain to the output of block 416. The output of block 420 is sent to the dynamic quasi-Newton block 328 (FIG. 3) and is sent back to node 412.

One skilled in the art will realize that the RLS estimation is a special case of a Kalman filter.

Derivations, theorems and proofs for the above mentioned dynamic quasi-Newton algorithm, dynamic Broyden Jacobian update and the RLS estimation are described in detail in the Ph.D. thesis paper entitled *Dynamic Quasi-Newton Method for Model Independent Visual Servoing,* by Jennelle Armstrong Piepmeier, Georgia Institute of Technology, Atlanta, Ga., Jul. 29, 1999, which is incorporated entirely herein by reference.

V. Test Results of the Present Invention When Reduced to Actual Practice

Figure 5:
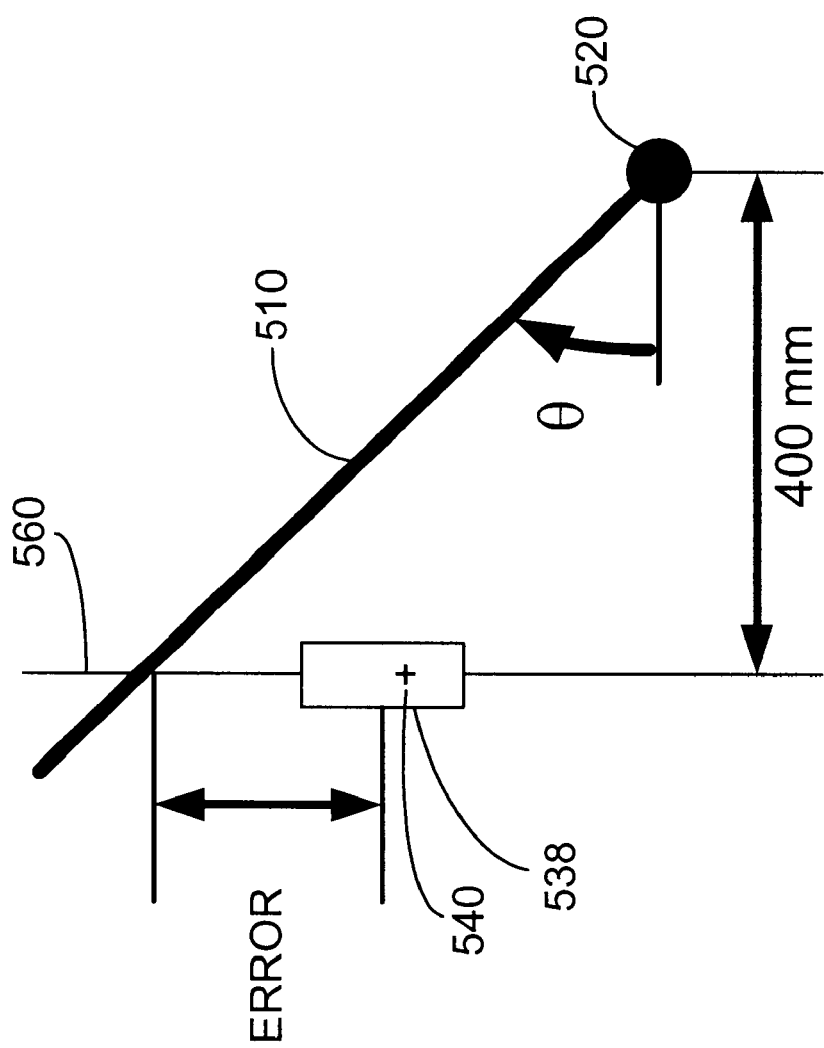
FIG. 5 is a diagram of a one degree-of-freedom system used in testing the dynamic controller of FIG. 2.

FIG. 5 shows a simple one degree-of-freedom (1 DOF) system that has been simulated to test the dynamic controller of the present invention and dynamic Broyden's update method. A target 540 is shown on a workpiece 538. An arm 510 fixed to a controllable rotary joint 520 is located 400 millimeters (mm) from the midpoint of the target 540 motion. A sensory system, such as the camera 36 and controller 14 of FIG. 1, determines the position of the target 540 and where the arm 510 crosses the line 560 of target 540 motion. No noise was added to the sensor data for this simulation. Error is measured as the distance between the arm 510 and the target 540 along the line of target motion.

The target 540 is moving sinusoidally with an amplitude of 250 mm at 1.5 radians/second (rad/s) which results in a maximum speed of 375 millimeters/second (mm/sec). The simulation is performed with a 50 ms sampling period. Velocity state estimates are computed by first order differencing of the target 540 position.

Figure 6A:
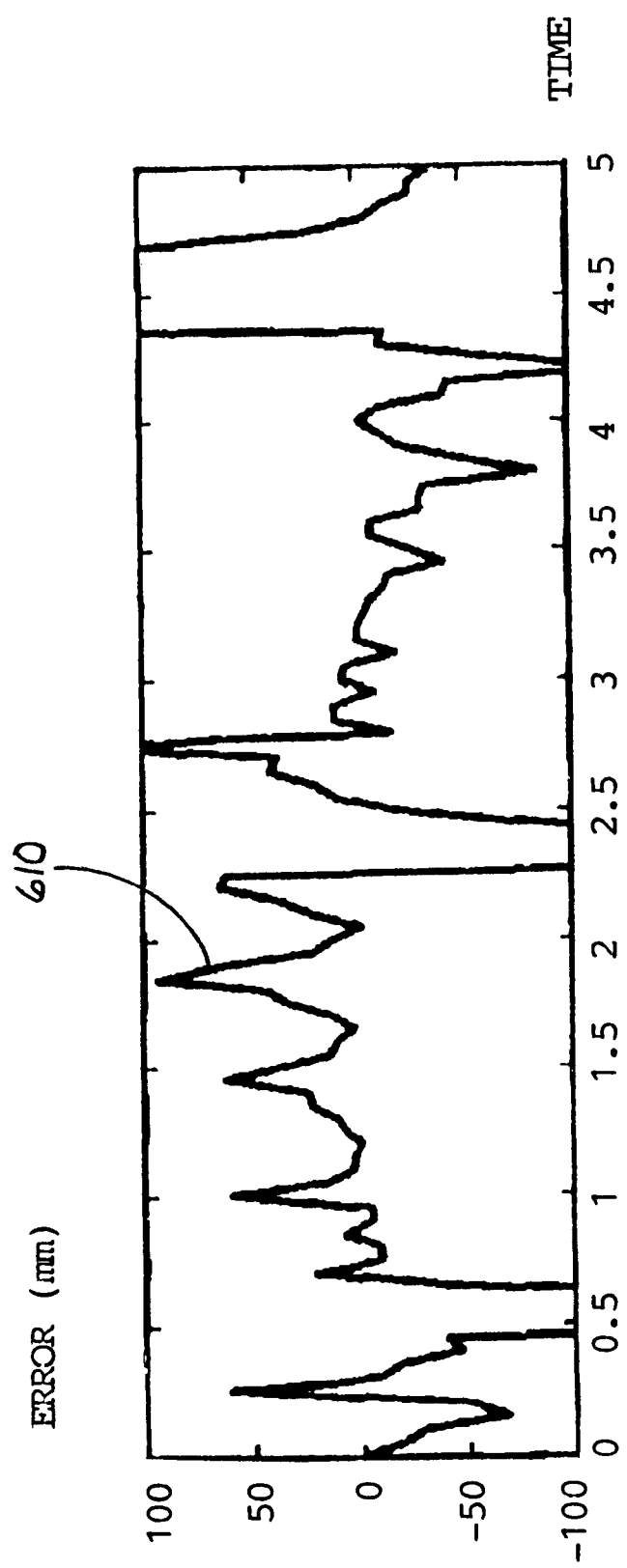
FIG. 6A is a graphical representation illustrating the tracking error of the one degree-of-freedom system of FIG. 5 using prior art control methods.
Figure 6B:
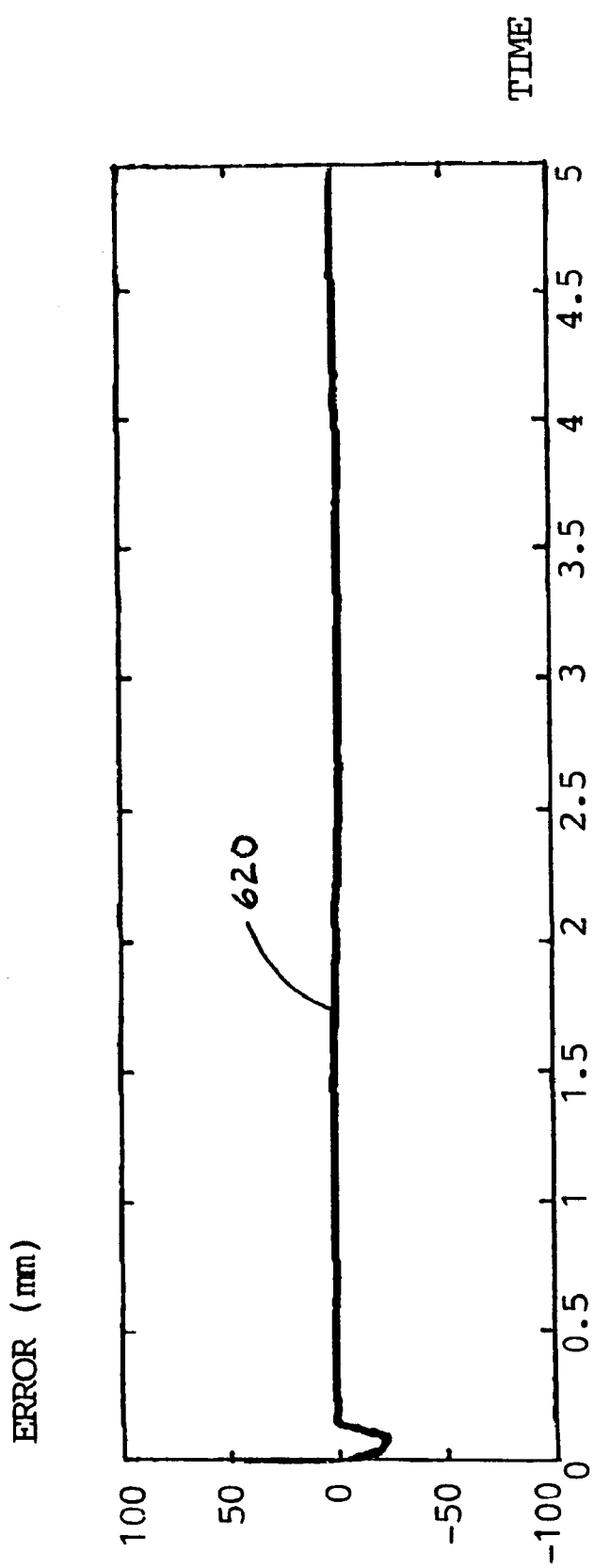
FIG. 6B is a graphical representation illustrating the tracking error of the one degree-of-freedom system of FIG. 5 using control methods of the present invention.

FIG. 6A shows the tracking error 610 for a controller operating under a prior art static quasi-Newton method for the system of FIG. 3. FIG. 6B shows the tracking error 620 for a controller operating under a dynamic quasi-Newton method of the present invention for the system of FIG. 5. The error 610 for the prior art static quasi-Newton method in FIG. 6A appears chaotic, and contains spikes several orders of magnitude higher than the amplitude of the target 540 (FIG. 5) motion. The root mean square (rms) error for the prior art static quasi-Newton method in FIG. 6A is about 55 mm.

The steady-state error 620 using the dynamic quasi-Newton method of the present invention, shown in FIG. 6B, has an rms value of approximately 1 mm. These results for a one degree-of-freedom system of FIG. 5 with a controller operating under a dynamic quasi-Newton method of the present invention strongly validate the control law and dynamic Broyden Jacobian update of the present invention.

The above-described one-dimensional sensor-based control example demonstrates a significant performance improvement for the tracking of moving targets using dynamic quasi-Newton method and dynamic Broyden Jacobian estimator for a 1-DOF manipulator. Similar success for visual servo control of a 6-DOF manipulator in simulation is described in detail in the above-mentioned IEEE proceedings paper, *A Dynamic Quasi-Newton Method for Uncalibrated Visual Servoing,* which is incorporated entirely herein by reference.

VI. Alternative Embodiments

The dynamic quasi-Newton algorithm can be implemented in hardware, software, firmware, or a combination thereof. In the preferred embodiment, the dynamic quasi-Newton algorithm is implemented in software or firmware that is stored in a memory and that is executed by a suitable instruction execution system. If implemented in hardware, as in an alternative embodiment, the dynamic quasi-Newton algorithm can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

A dynamic quasi-Newton algorithm program, which includes an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

Figure 7:
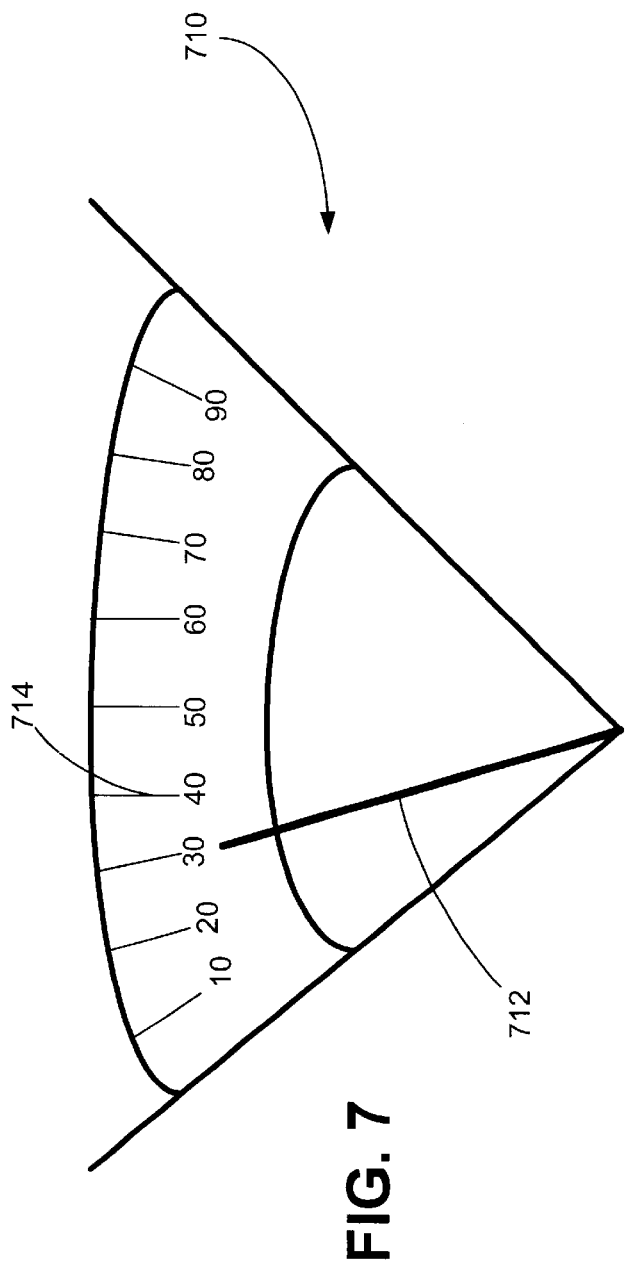
FIG. 7 is a diagram of a car speedometer which is controlled by an alternative in embodiment of the controller.

Another alternative embodiment of a mechanical system controller employing the above-described processing algorithm is a car cruise control system. A car speedometer 710 is shown in FIG. 7. Here, the present car speed of 30 miles per hour (MPH) is indicated by the speedometer needle 712. If the desired speed is 40 mph, the car is required to accelerate until the desired 40 mph speed is reached. One skilled in the art will realize that this simple control problem is actually quite complex. Many system parameters are constantly changing. Such changing parameters include the mass of the car (weight), surface of the road (flat, uphill or downhill), and power delivery capabilities of the motor and power train (transmission gear state, fuel consumption rate, etc.). Prior art methods have produced reasonably effective controllers for a car cruise control system which anticipates and accounts for many of these variable parameters. However, other non-variable parameters in the prior art models could change, such as a change in a speed sensor as the speedometer cable stretches and wears with time. Changes in these types of parameters could not be accounted for in a prior art mechanical system model. With the present invention, the car speed and the desired speed are the only two required controller inputs (mechanical system parameters) necessary for the computer controller. For example, the car speed could be sensed by the angular position of the speedometer needle 712. The desired speed could be specified using any method commonly employed in the art. A controller for a car cruise control system implemented by the processing algorithm would not be affected by changes in parameters modeled in the prior art controllers.

Figure 8:
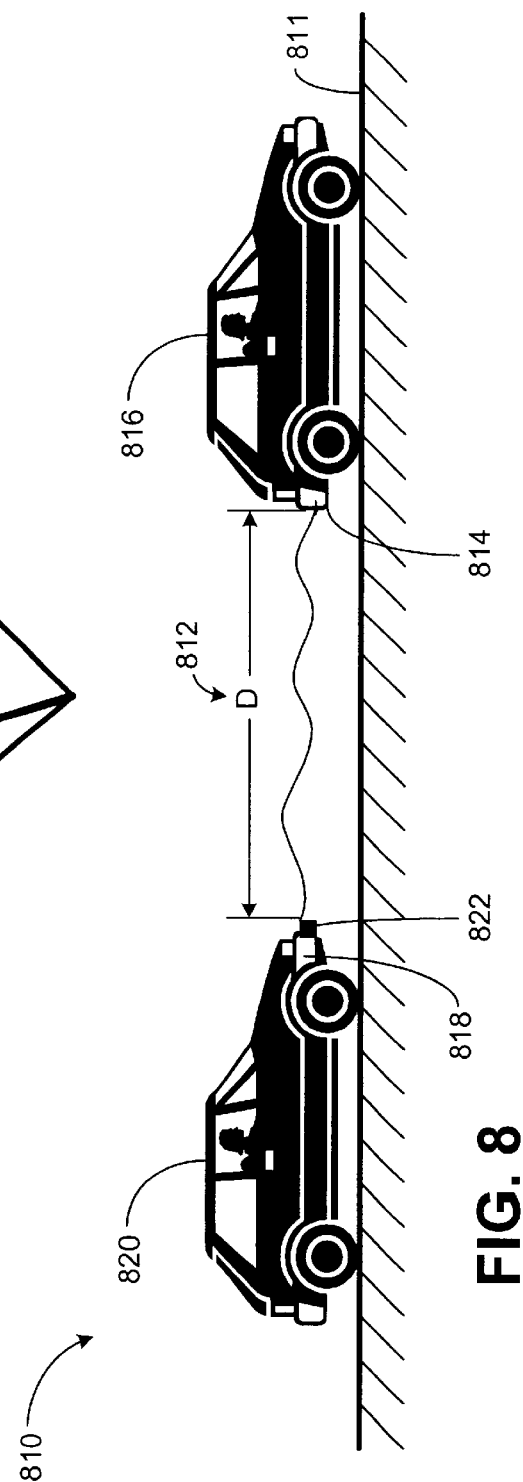
FIG. 8 is a diagram of a mechanical system having two cars separated by a distance which is controlled by an alternative embodiment of the controller.

Additionally, the above-described processing algorithm enables a controller which is applicable to other tracking systems. An example of another alternative embodiment is an automatic car spacing control system. Such a controller would be significantly more complex than the above-mentioned car cruise control system. A mechanical system 810 with two cars travelling on a road 811 is shown in FIG. 8. The objective of the controller is to ensure that a minimum distance, D 812, is maintained. D 812 is measured from the rear bumper 814 of the lead car 816 to the front bumper 818 of the following car 820. For this embodiment of the present invention, the control action would be deceleration of the following car 820 whenever the minimum distance, D 812, criteria is violated. Sensor 822 measures the actual distance between the front bumper 818 and the rear bumper 814. Such a sensor could be based on any one of a variety of sensing techniques commonly employed in the art, such as infrared, microwave, radar, sound, vision or the like. A controller employing the apparatus and method of the present invention would sense the actual distance and adjust the speed of the following car 820 whenever the minimum distance, D 812, criteria is violated. A significant advantage of the controller is that a detailed model of the position of sensor 822 is not required. That is, the sensor could be disposed on the following car 820 at any convenient location. Also, since no mechanical system model is required, the controller would work equally well on any model, make or variation of any motorized vehicle. Furthermore, this embodiment of the controller would work equally well on any moving object, such as a boat, train, airplane or the like, particularly if the controller provided a warning indication coupled with the control action.

Figure 9:
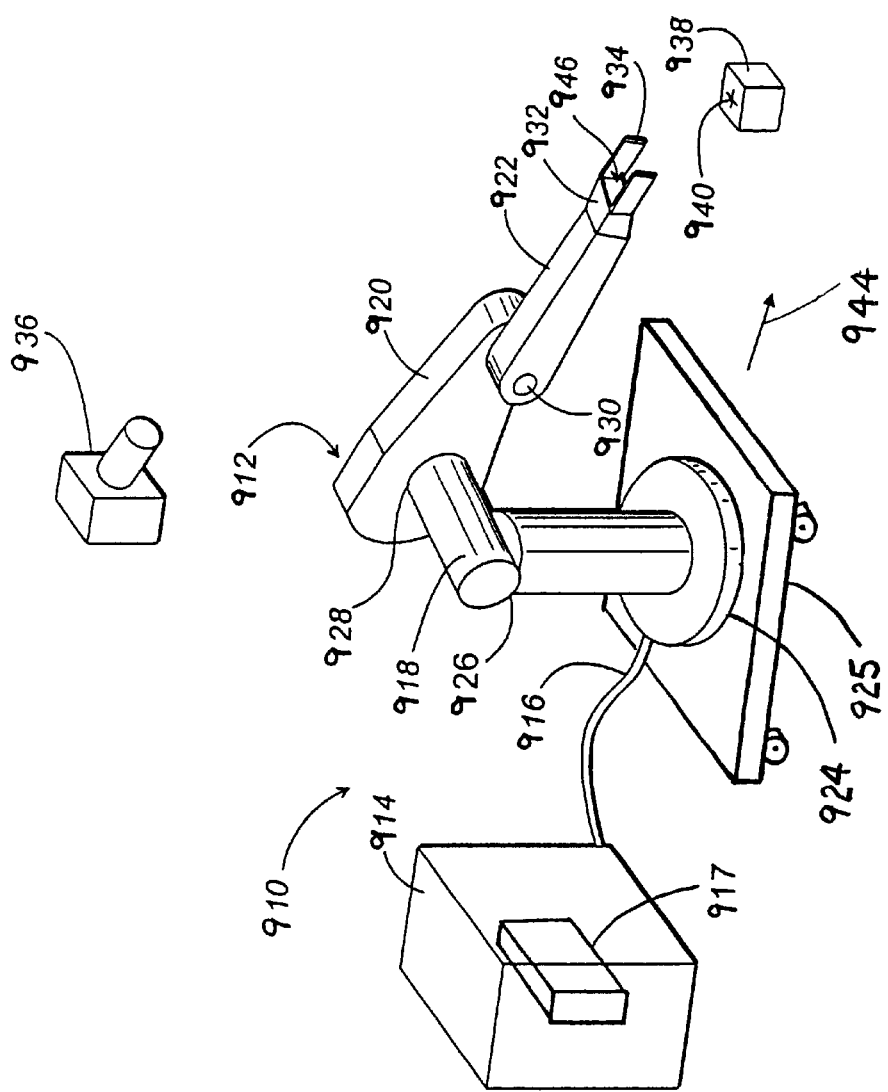
FIG. 9 is a diagram of a robot and workpiece system where the robot is moving towards the workpiece.

The above-described controller is equally applicable to other types of robotic devices with at least one degree of freedom (DOF) in movement of an end effector. One such possible alternative embodiment would control a mobile robot when the workpiece position is fixed. FIG. 9 illustrates such a mechanical system having a mobile robot 910. Mobile robot 910 is similar in construction to the robot 10 of FIG. 1. This alternative embodiment operates in a similar manner as the preferred embodiment of the present invention, except that workpiece 938 does not move. A pedestal 924 is mounted on a mechanized carriage 925, or the like. Elements in FIG. 9 that are similar to those in FIG. 1 bear similar reference numerals in that reference numerals in FIG. 9 are preceded by the numeral "9".

Processor 917 provides control signals to controller 914 based upon the images of the target 940 on workpiece 938 and the point 946 on end effector 934 detected by camera 936. The predetermined task of moving end effector 934 to the workpiece 938 is accomplished by moving robot arm 912 members 918, 920 and 922 (by adjusting the angular positions of joints 926, 928, 930 and 932) in a manner substantially similar to that in the preferred embodiment. Additionally, the mobile robot 910 is moved towards the workpiece 938 by repositioning the carriage 925 in the direction shown by arrow 944.

Using the above-described controller, a detailed model of the mechanical system shown in FIG. 9 is not required.

Jacobian updates based upon the dynamic quasi-Newton algorithm would be similar to that of the preferred embodiment, and would include additional velocity components for the motorized carriage 925.

VII. Variations and Modifications

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for calculating control data for controlling a first parameter of a system, comprising the steps of:
   receiving data that represents a measurement of said first parameter in said system;
   translating said data using at least rate of change information of said first parameter using a dynamic quasi-Newton algorithm; and
   producing a translation model, wherein said translation model enables control of said first parameter so that said first parameter converges toward a predefined second parameter.

2. The method of claim 1, wherein said translation model is a linear mathematical Jacobian.

3. The method of claim 1, wherein said translation model is a non-linear mathematical Jacobian.

4. The method of claim 1, wherein said predefined second parameter is chosen from the group consisting of a distance, a specific location, a specific temperature, a temperature range, a specific pressure, a pressure range, a specific volume, and a volume range.

5. The method of claim 1, further comprising the step of producing at least one control signal for a controller, based upon said translation model, and without creating and using a kinematic model of said system.

6. The method of claim 1, wherein said translation model includes at least velocity information associated with said first parameter.

7. The method of claim 6, wherein said velocity information is modified by addition of a number.

8. The method of claim 6, wherein said velocity information is modified by multiplication by a number.

9. The method of claim 6, wherein said velocity information is modified by integration.

10. The method of claim 6, wherein said system has a workpiece and a robot having at least one degree of freedom based upon at least one moveable connector on said robot, said first parameter represents a distance between an end-effector of said robot and a target point associated with said workpiece, and said rate of change information includes velocity information associated with said workpiece.

11. The method of claim 6, wherein said system has a workpiece and a robot having at least one degree of freedom based upon at least one moveable connector on said robot, said first parameter represents a distance between an end-effector of said robot and a target point associated with said workpiece, and said rate of change information includes velocity information associated with said target point.

12. The method of claim 6, wherein said system has a workpiece and a robot having at least one degree of freedom based upon at least one moveable connector on said robot, said first parameter represents a distance between an end effector of said robot and a target point associated with said workpiece, and said rate of change information includes velocity information associated with said end effector.

13. The method of claim 6, wherein said system has a workpiece, a camera and a robot having at least one degree of freedom based upon at least one moveable connector on said robot, said first parameter represents a distance between an end effector of said robot and a target point associated with said workpiece, and said rate of change information includes velocity information associated with said camera.

14. The method of claim 6, wherein said system has a workpiece and a robot having at least one degree of freedom based upon at least one moveable connector on said robot, said first parameter represents a distance between an end effector of said robot and a target point associated with said workpiece, and said velocity information comprises an angle for each at least one moveable connector of said robot and a corresponding time associated with said angle.

15. The method of claim 14, wherein said at least one moveable connector has a joint.

16. The method of claim 1, wherein said second parameter represents a predefined distance threshold.

17. The method of claim 1, wherein said second parameter represents a predefined location having a parameter value of zero.

18. The method of claim 17, wherein said first parameter represents a distance between a first point and a second point and said system has a robot having at least one degree of freedom based upon at least one moveable connector, said method further comprising the steps of:
 acquiring at least one image of said first point and said second point;
 producing an error signal from said at least one image, said error signal representing a displacement between said first point and said second point;
 producing said translation model as a mathematical dynamic Broyden Jacobian update, said mathematical dynamic Broyden Jacobian update comprising at least one angle with a corresponding time for said error signal;
 producing control data for said system based upon at least one future error signal derived from a dynamic Broyden Jacobian update, said control data comprising said at least one angle and said corresponding time information; and
 adjusting said moveable connector according to said control data.

19. The method of claim 1, wherein said first parameter represents a distance between a first point and a second point.

20. The method of claim 19, wherein said second point is moving and said method further comprises the step of adjusting said translation model based upon movement of said second point.

21. The method of claim 19, wherein said system has a robot and a workpiece.

22. The method of claim 21, wherein said first point is on said robot and said second point is a target point on said workpiece.

23. The method of claim 22, wherein said first point is an end-effector on said robot.

24. The method of claim 1, further comprising the step of sensing said data.

25. The method of claim 24, wherein said predefined second parameter is any one of the following: a distance, a specific location, a specific temperature, a temperature range, a specific pressure, a pressure range, a specific volume, a volume range.

26. The method of claim 24, wherein the sensing step employs a visual detection system.

27. The method of claim 26, wherein said visual detection system employs at least one camera.

28. The method of claim 27, wherein said at least one camera is moving.

29. The method of claim 1, further comprising the step of determining control data for a controller from said translation model, said controller configured to control said first parameter.

30. The method of claim 29, wherein said control data comprises an angular position of a moveable connector associated with said system and a time associated with said angular position.

31. The method of claim 30, further comprising the step of adjusting said moveable connector according to said control data.

32. The method of claim 1, wherein said translation model includes a dynamic Broyden Jacobian update.

33. The method of claim 32, wherein said translation model includes a dynamic recursive least squares Jacobian update.

34. The method of claim 1, wherein said translation model includes a dynamic recursive least squares Jacobian update.

35. A method for calculating control data for controlling a first parameter of a system, comprising the steps of:
 receiving data that represents a measurement of said first parameter in said system;
 translating said data using at least rate of change information of said first parameter; and
 producing a translation model that includes a dynamic Broyden Jacobian update, wherein said translation model enables control of said first parameter so that said first parameter converges toward a predefined second parameter.

36. The method of claim 35, wherein said translation model includes a dynamic recursive least squares Jacobian update.

37. A method for calculating control data for controlling a first parameter of a system, comprising the steps of:
 receiving data that represents a measurement of said first parameter in said system;
 translating said data using at least rate of change information of said first parameter; and
 producing a translation model that includes a dynamic recursive least squares Jacobian update, wherein said translation model enables control of said first parameter so that said first parameter converges toward a predefined second parameter.

38. A method for controlling a system having at least one degree of freedom based upon at least one moveable connector so that said system learns how to track such that a first point tracks a second point that is moving, comprising the steps of:
 acquiring at least one image of said first point and said second point;
 producing an error signal from said at least one image, said error signal representing a displacement between said first point and said second point in said image;
 producing a translation model using a dynamic quasi-Newton algorithm for converting image space coordinates into system space coordinates, said translation model having at least velocity information pertaining to said first point and said second point; and causing said first point to track said moving second point by producing control data for said first point based upon at least one future error signal and said translation model.

39. The apparatus of claim 38, wherein said translation model includes a dynamic Broyden Jacobian update.

40. The method of claim 38, wherein said step of producing the translation model includes using a dynamic Broyden Jacobian update.

41. The method of claim 38, wherein said step of producing the translation model further includes using a dynamic recursive least squares Jacobian update.

42. The method of claim 41, wherein said translation model includes a dynamic recursive least squares Jacobian update.

43. An apparatus for controlling a first parameter in a system, comprising:
   a receiver which receives data that represents a measurement of said first parameter in said system;
   a translator which translates said data using a dynamic quasi-Newton algorithm and at least rate of change information of said first parameter; and
   a translation model based upon translation of said data.

44. The apparatus of claim 43, wherein said translation model is created without a kinematic model of said system.

45. The apparatus of claim 43, wherein said translation model includes at least velocity information associated with said first parameter.

46. The apparatus of claim 45, wherein said system has a workpiece and a robot having at least one degree of freedom based upon at least one moveable connector on said robot, said first parameter represents a distance between a first point and a second point, and said velocity information comprises an angle for each at least one moveable connector of said robot and a corresponding time associated with said angle.

47. The apparatus of claim 46, wherein said at least one moveable connector has a joint.

48. The apparatus of claim 46, wherein said first point is an end effector of said robot and said second point is a target point associated with said workpiece.

49. The apparatus of claim 46, further comprising a controller, said controller producing at least one control signal for controlling said first parameter.

50. The apparatus of claim 49, wherein said second point is moving and translator adjusts said translation model based upon movement of said second point.

51. The apparatus of claim 50, wherein said at least one control signal adjusts said at least one moveable connector so that said apparatus learns how to track and tracks said moving second point.

52. The apparatus of claim 51, wherein said at least one control signal adjusts said at least one moveable connector causing said first point to converge toward a predefined distance of said second point.

53. The apparatus of claim 50, further comprising:
   a visual detector, said visual detector acquiring at least one image of said first point and said second point; and
   an error signal generator producing an error signal from said at least one image, each said error signal representing a displacement between said first point and said second point.

54. The apparatus of claim 53, said control signal is based upon at least one future error signal derived from a dynamic Broyden Jacobian update.

55. The apparatus of claim 43, wherein said translation model includes a dynamic Broyden Jacobian update.

56. The apparatus of claim 55, wherein said translation model includes a dynamic recursive least squares Jacobian update.

57. The apparatus of claim 43, wherein said translation model includes a dynamic recursive least squares Jacobian update.

58. An apparatus for controlling a first parameter in a system, comprising:
   a receiver which receives data that represents a measurement of said first parameter in said system;
   a translator which translates said data using at least rate of change information of said first parameter; and
   a translation model based upon translation of said data that includes a dynamic Broyden Jacobian update.

59. The apparatus of claim 58, wherein said translation model includes a dynamic recursive least squares Jacobian update.

60. An apparatus for controlling a first parameter in a system, comprising:
   a receiver which receives data that represents a measurement of said first parameter in said system;
   a translator which translates said data using at least rate of change information of said first parameter; and
   a translation model based upon translation of said data that includes a dynamic recursive least squares Jacobian update.

61. A computer readable medium having a program for a first parameter in a system, the program comprising:
   logic configured to receive data that represents a measurement of said first parameter in said system;
   logic configured to translate said data using a dynamic quasi-Newton algorithm and using at least rate of change information of said first parameter; and
   logic configured to generate a translation model based upon translation of said data.

62. The program as defined in claim 61, wherein said logic configured to generate said translation model includes a dynamic Broyden Jacobian update.

63. The program as defined in claim 62, wherein said logic configured to generate said translation model includes a dynamic recursive least squares Jacobian update.

64. The program as defined in claim 61, wherein said logic configured to generate said translation model includes a dynamic recursive least squares Jacobian update.

65. A computer readable medium having a program for a first parameter in a system, the program comprising:
   logic configured to receive data that represents a measurement of said first parameter in said system;
   logic configured to translate said data using at least rate of change information of said first parameter; and
   logic configured to generate a translation model based upon translation of said data that includes a dynamic Broyden Jacobian update.

66. The program as defined in claim 65, further comprising logic to include at least velocity information associated with the first parameter.

67. The program as defined in claim 66, further comprising:
   logic to control a robot having at least one degree of freedom based upon at least one moveable connector on said robot;
   logic configured to interpret said first parameter as a distance between a first point and a second point; and
   logic configured to determine said velocity information as an angle for each at least one moveable connector of said robot and a corresponding time associated with said angle.

68. The program as defined in claim 67, further comprising logic configured to generate a control signal to control adjustment of said moveable connector of said robot such that said first point converges toward to a predefined distance of said second point.

69. The program as defined in claim 68, wherein said second point is moving.

70. The program as defined in claim 69, further comprising:

logic to interpret an image from a visual detector, said visual detector acquiring at least one image of said first point and said second point; and logic configured to generate an error signal from said at least one image, each said error signal representing a displacement between said first point and said second point.

71. The program as defined in claim 70, wherein said logic configured to generate a control signal is based upon at least one future error signal derived from a dynamic Broyden Jacobian update.

72. The program as defined in claim 70, wherein said logic configured to generate a control signal is based upon at least one future error signal derived from a dynamic recursive least squares Jacobian update.

73. The program as defined in claim 65, wherein said logic configured to generate said translation model includes a dynamic recursive least squares Jacobian update.

74. A computer readable medium having a program for a first parameter in a system, the program comprising:

logic configured to receive data that represents a measurement of said first parameter in said system;

logic configured to translate said data using at least rate of change information of said first parameter; and logic configured to generate a translation model based upon translation of said data that includes a dynamic recursive least squares Jacobian update.

* * * * *

UNITED STATES PATENT AND TRADEMARK OFFICE
CERTIFICATE OF CORRECTION

PATENT NO.   : 6,278,906 B1
DATED        : August 21, 2001
INVENTOR(S)  : Piepmeier et al.

It is certified that error appears in the above-identified patent and that said Letters Patent is hereby corrected as shown below:

Title page,
Item [75], Inventors, delete the phrase "Jennelle Armstrong Piepmeier, Severna Park; Harvey Lipkin, Decatur; Gary Von McMurray, Atlanta, all of GA (US)" and substitute therefor -- Jenelle Armstrong Piepmeier, Severna Park, MD; Harvey Lipkin Decautr, GA; and Gary Von McMurray, Atlanta, GA all of US --.

Item [56], References Cited, delete the line "4,338,672, 7/1982, Perzley" and substitute therefor -- 4,338, 672, 7/1982, Perzley, 770/249 --.

Item [56], References Cited, delete the line 5,430,643, 7/1995, Seraji, 700/249" and substitute therefor -- 5,430,643, 7/1995, Seraji, 700/263 --.

Item [56], References Cited, OTHER PUBLICATIONS, delete the phrase "N. Papanikolopoulos and P. Khosla, "Robotic Visual Servoing Around a Static Target: An Example of Controlled Active Vision," in Proceedings of the 1992 American Control Conference, Nic, France, May 1992, pp. 1489-1494." and substitute therefor -- Robotic Visual Servoing Around a Static Target: An Example of Controlled Active Vision," in Proceedings of the 1992 American Control Conference, Nice, France, May 1992, pp. 1489-1494. --.

Item [56], References Cited, OTHER PUBLICATIONS, delete the phrase "N. Papanikolopoulos, P.K. Khosla, and T. Kanade, "Vision and Control Techniques for Robotic Visual Tracking," Apr. 1991, pp. 857-864." and substitute therefor -- N. Papanikolopoulos, P.K. Khosla, and T. Kanade, "Vision and Control Techniques for Robotic Visual Tracking," in Proceedings of the 1991 IEEE International Conference on Robotics and Automation, Sacramento, California, Apr. 1991, pp. 857-864. --.

Column 7,
Line 19, delete the equation "$F(\theta + h_\theta, t + h_t) = F(\theta,t) + F_{74}h_{74} + F_t h_t +...$"
and substitute therefor -- $F(\theta + h_\theta +, t + h_t) = F(\theta,t) + F_\theta h_\theta + F_t h_t +...$ --.

Line 38, delete the equation "$h_\theta = -(F_{\theta\theta})^{-1} (F_{74} + F_{t\theta} h_t)$" and substitute therefor -- $h_\theta = -(F_{\theta\theta})^{-1} (F_\theta + F_{t\theta} h_t)$ --.

Line 49, delete the equation "$F_\theta = J_k^{Tf} f_k$" and subtitute therefor -- $F_\theta = J_k^T f_k$ --.

Column 10,
Line 29, add the phrase -- End for --.
Line 30, delete the phrase "End for".
Line 42, after the word "iteration," delete the equation "$\hat{J}_k h_{74}$" and substitute therefor -- $\hat{J}_k h_\theta$ --.

UNITED STATES PATENT AND TRADEMARK OFFICE
CERTIFICATE OF CORRECTION

PATENT NO. : 6,278,906 B1
DATED : August 21, 2001
INVENTOR(S) : Piepmeier et al.

It is certified that error appears in the above-identified patent and that said Letters Patent is hereby corrected as shown below:

Column 11,
Line 17, after the word "by" delete the word "Jennelle" and substitute therefor
-- Jenelle --.

Signed and Sealed this

Thirtieth Day of July, 2002

Attest:

JAMES E. ROGAN
Attesting Officer    Director of the United States Patent and Trademark Office